Jan. 1, 1957     H. A. BRUNTJEN     2,775,877
BEVERAGE COOLING, DISPENSING AND MIXING MACHINE
Filed July 23, 1954     2 Sheets-Sheet 1
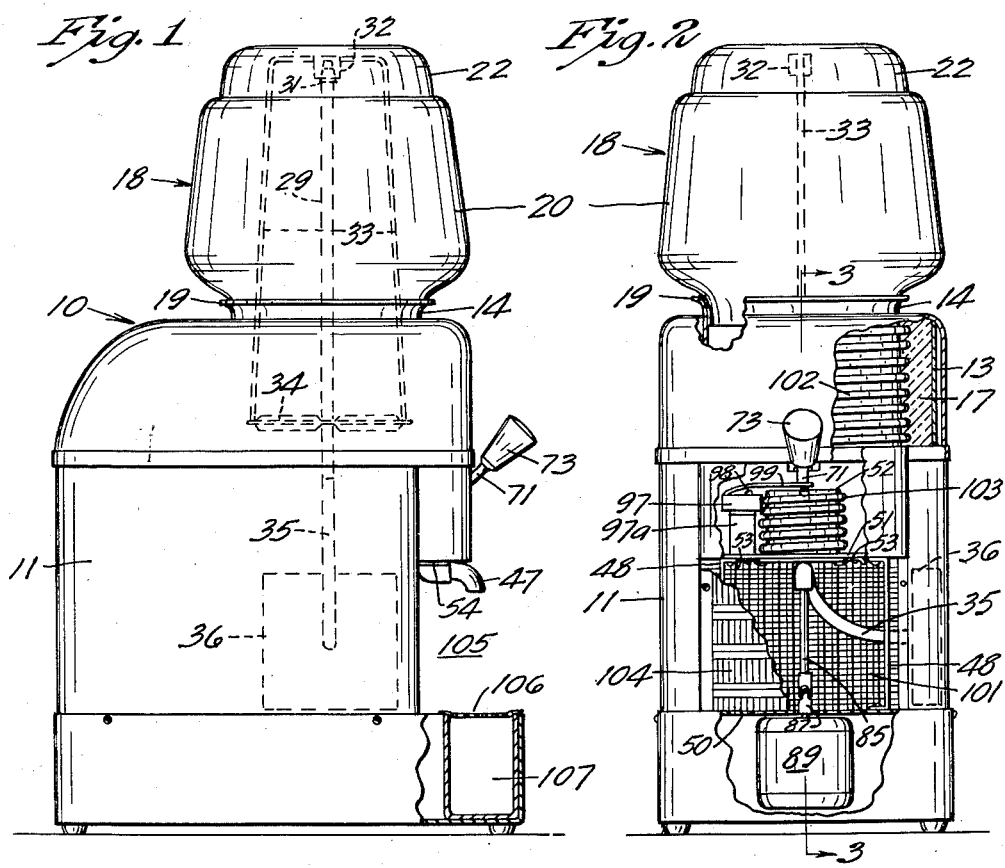
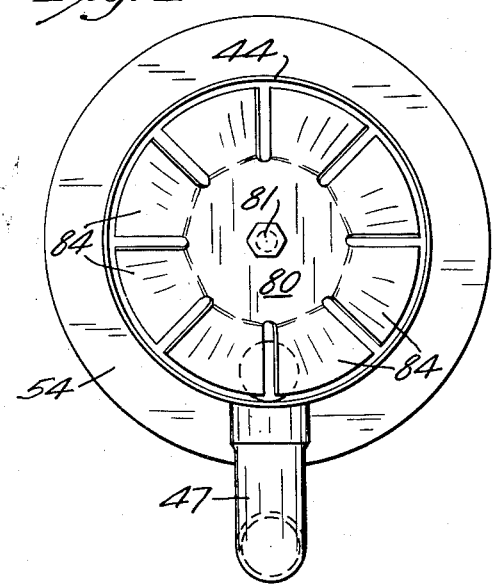
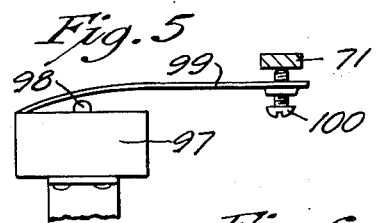
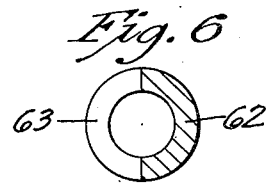
INVENTOR.
Herman A. Bruntjen
BY
Merchant & Merchant
ATTORNEYS

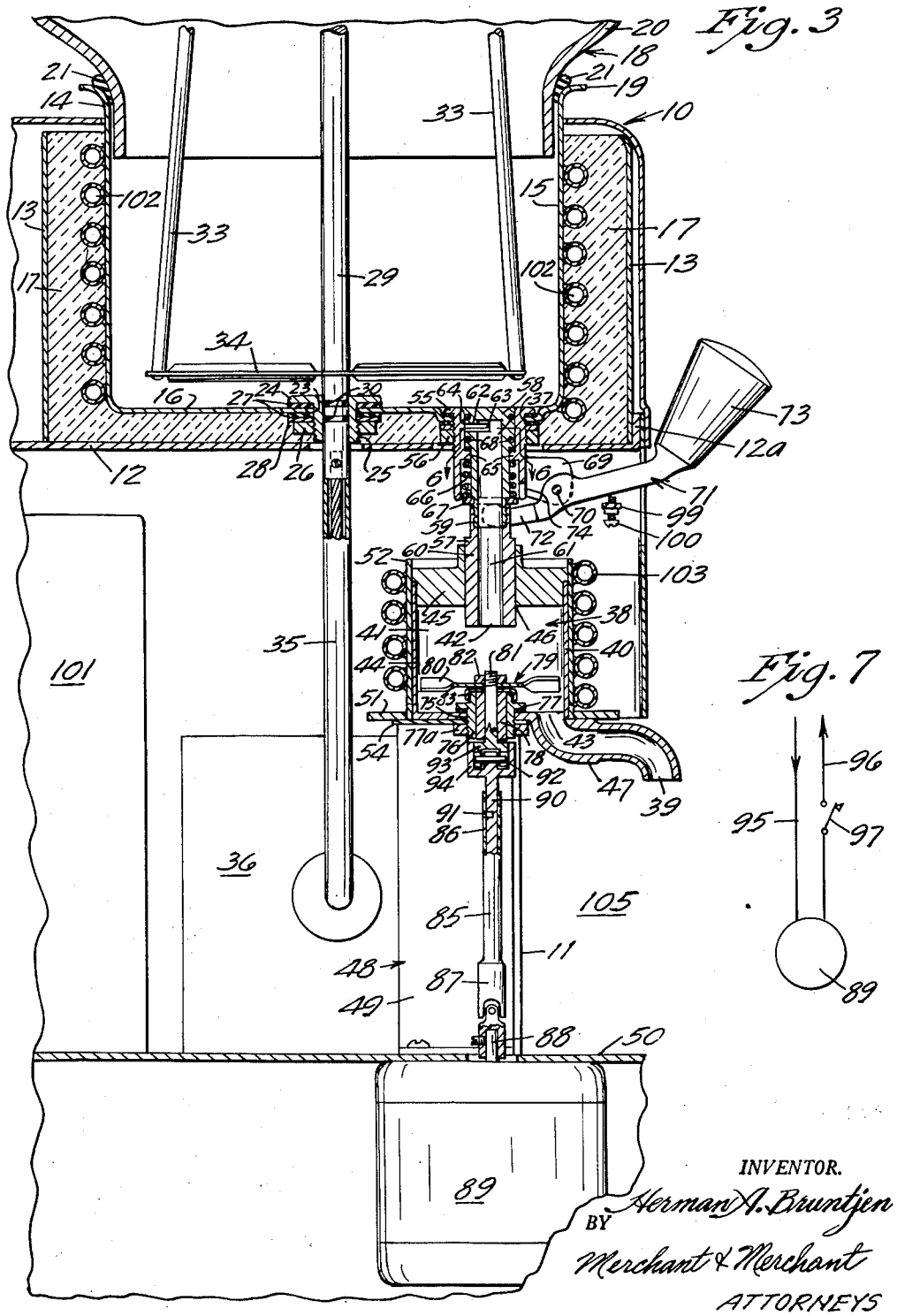

United States Patent Office 2,775,877
Patented Jan. 1, 1957

2,775,877
BEVERAGE COOLING, DISPENSING AND MIXING MACHINE

Herman A. Bruntjen, Minneapolis, Minn.

Application July 23, 1954, Serial No. 445,321

8 Claims. (Cl. 62—141)

My invention relates to improvements in beverage dispensing machines, and more particularly to an improved dispensing machine which will automatically aerate the beverage to a smooth creamy consistency during the dispensing thereof; this being accomplished, in the preferred embodiment of the invention illustrated herein, by violent agitation of the beverage in the presence of air while it is flowing through the machine during each dispensing operation.

It is well recognized that beverages are improved by aeration, such as can be achieved by violent agitation in the presence of air immediately prior to serving, which produces a beverage of smooth, creamy consistency. In the past, this has been done after the beverage has been dispensed into a drinking cup or container by means of an agitator, such for example as the customary malted milk mixer, but this procedure has been objectionable for the following reasons, to wit:

1. Because considerably additional time is consumed on the part of an operator transferring the dispensed beverage to a remote mixing machine, subjecting it to aeration, and then delivering it to the customer; and 2. Because of the fact that the temperature of the beverage is changed considerably and often objectionably during the course of handling and aeration.

In accordance with the instant invention these objections to prior art practices are overcome, and other benefits achieved, by the provision of means in a beverage dispensing machine for automatically thoroughly aerating the beverage, by violent agitation in the presence of air, while it is freely flowing through the machine during each dispensing operation.

Other important objects and advantages of the invention, including an improved structure for accomplishing the above objectives, will be made further apparent or elaborated on in the following specification, claims and appended drawings.

Referring to the drawings, which illustrate the invention, and in which like characters indicate like parts throughout the several views:

Fig. 1 is a view in side elevation with some parts broken away of my novel and improved beverage dispenser;

Fig. 2 is a view in front elevation with some parts broken away of the structure shown in Fig. 1;

Fig. 3 is a fragmentary view in cross section on an enlarged scale taken substantially along the line 3—3 of Fig. 2;

Fig. 4 is a top plan view on an enlarged scale of a portion of the conduit defining the agitating and aerating chamber of my invention, separated from its position in the structure and with the top thereof removed to show the concentric agitator impeller therein, and attached discharge nozzle;

Fig. 5 is an enlarged detailed view showing the switching mechanism actuating the rotary agitator and aerator;

Fig. 6 is an enlarged view in cross section taken substantially along the line 6—6 of Fig. 3; and Fig. 7 is a schematic showing of the circuit controlling the operation of the agitator and aerator motor.

Referring more particularly to the drawings, general reference numeral 10 indicates my novel and improved bulk beverage dispenser in its entirety. Dispenser 10 has a housing 11; and mounted therein, a horizontally positioned supporting plate 12 having an upwardly turned front edge 12a. A cylindrical internal casing 13 projects vertically upwardly from plate 12 to form an enclosure for a substantially bowl-shaped receptacle 14 having a cylindrically-shaped side wall 15 spaced inwardly from the casing 13 and an apertured bottom wall 16 spaced upwardly from the plate 12. The space between walls 15 and 16 and casing 13 and plate 12 is filled with a heat insulating material 17. Receptacle 14 forms the bottom portion of a beverage receptacle shown as being in the nature of a reservoir, indicated in its entirety by the numeral 18, and has a flared lip 19 forming a seat for a transparent intermediate portion 20 of the reservoir 18. Intermediate portion 20 carries an annular rubber gasket 21 adjacent the lower end thereof which seats against the flared lip 19. A top cover 22 of the reservoir 18 is positioned at the top of the intermediate portion 20 and is easily removable therefrom to give access to the beverage reservoir for the insertion of a beverage syrup dispensed therefrom.

Receptacle 14 has a central aperture 23 through which extends a flanged sleeve or bushing 24 having an outer threaded end 25 adapted to receive a nut 26 which secures it into position. Rubber gaskets 27 are positioned between the flange of sleeve 24 and the bottom wall 16 and between the bottom wall 16 and the nut 26, the latter gasket separated from the nut 26 by a steel washer 28. Positioned within the sleeve 24 for rotation is a rigid shaft 29 carrying O-rings 30 to give a fluid seal between the shaft 29 and sleeve 24. Shaft 29 extends vertically upwardly within the beverage reservoir 18 to a bearing head 31 adapted to be in frictional engagement by gravity with a stub shaft 32 secured to inverted L-shaped support rods 33. Rods 33 at their lower ends are secured to the outer ends of two agitator blades 34 which project radially outwardly from an axial aperture through which loosely passes the shaft 29. Shaft 29 is connected by a flexible drive shaft 35 to the drive shaft of a conventional motor 36, not shown in detail but enclosed within the housing 11. Motor 36 drives the shaft 29 and therewith the rods 33 and agitator blades 34 to provide a constant mixing of the beverage syrup within the beverage reservoir 18.

Referring in particular to Fig. 3, receptacle 14 is provided with an aperture 37, laterally offset from the central aperture 23 formed therein; and a gravity flow conduit, indicated in its entirety by the numeral 38, extends from the aperture 37 and leads generally downwardly from the reservoir 18 to an open discharge end 39 which is in constant communication with atmosphere at a dispensing zone, more specifically described subsequently. Conduit 38 comprises in part a diametrically enlarged intermediate portion 40 defining an air chamber 41 having an inlet 42 and an outlet 43. More specifically, and in the preferred embodiment herein disclosed, intermediate portion 40 of the conduit 38 comprises substantially an open-topped cylinder 44 closed by a tightly fitting cover 45 having an axially aligned opening 46. Intermediate portion 40 of conduit 38 is vertically disposed in position by a bracket 48 comprising a vertically extending standard 49 secured to a horizontally disposed partition 50 of the housing 11, and a horizontally disposed mounting plate 51 vertically upwardly spaced from the partition 50. Secured to and extending vertically upwardly from the mounting plate 51 is a cylindrical sleeve 52 in which is fitted the intermediate portion 40, which is detachably secured in position by clips 53 secured to the mounting plate 51 and adapted to releasably engage a bottom plate 54 secured to the bottom of cylinder 44.

Outlet 43 of the air chamber 41 is an axially offset opening in the bottom wall of the cylinder 44, and a nozzle 47 secured to the cylinder 44 extends from the outlet 43 to the open discharge end 39. Nozzle 47 comprises that portion of the conduit section 38 positioned below the air chamber 41.

That portion of conduit 38 positioned above the air chamber 41 comprises, in the preferred embodiment herein disclosed, a sleeve 55, which extends through aperture 37 and is fastened to the bottom wall 16 together with suitable sealing washers by means of a nut 56, and a cylindrical conduit section 57 positioned for longitudinal movement in sleeve 55. Conduit section 57 comprises a top end 58, a reduced intermediate portion 59 and a bottom end 60, and has an axially aligned cylindrical bore 61 extending through end 60. Conduit section 57 extends vertically between aperture 37 in receptacle 14 and opening 46 in cover 45. The opening of bore 61 at the lower extremity of end 60 into air chamber 41 defines the inlet 42 which is axially aligned with the air chamber 41.

A control valve, indicated by the numeral 62, in the conduit 38 between the reservoir 18 and the air chamber 41 is a sleeve-type valve formed by the movable conduit section 57 and sleeve 55, and comprises a cylindrical valve port 63, see Fig. 6, in top end 58 of conduit section 57 and the adjacent inner wall 64 of the sleeve 55. Sleeve 55 is provided with an inwardly projecting annular stop 65 adapted to engage the shoulder between end 58 and reduced intermediate portion 59 to limit the downward movement of conduit section 57 and to define the fully closed position of the control valve 62. A spring 66 extending between the stop 65 and a washer 67 secured to the intermediate portion 59 of conduit section 57 normally biases valve 62 in its closed position. Circumferentially carried by end 58 of conduit section 57 on either side of the port 63 are O-rings 68 to prevent any leakage past the valve 62 in either the open or closed position thereof.

Secured to the sleeve 55 are laterally outwardly projecting lugs 69 to which are pivotally secured by a removable pin 70 a control element 71, adapted to move conduit section 57 upwardly from the stop 65 to open the valve 62 against the bias of spring 66. Control element 71 comprises branched arm portions 72, joining adjacent the pin 70, which encircle the intermediate portion 59 on either side thereof and at their extremities are adapted to engage the washer 67. Control element 71 is provided with a handle end 73, the downward movement of which pivots branched arms 72 upwardly to move washer 67 and therewith conduit section 57 vertically upwardly. Sleeve 55 at its lower end, beneath lugs 69, is provided with a slot 74 which limits the upward pivotal movement of branched arms 72 to define the full open position of valve 62.

The bottom of cylinder 44 has an axially aligned opening 75 in which is mounted a sleeve 76 having a top flange 77. A sealing gasket is positioned between flange 77 and the bottom of cylinder 44 around the opening 75; and sleeve 76 is secured in position by means of a nut 77a. Mounted by sleeve 76 and a bushing 78 therein for rotation in air chamber 41 is a normally inoperative motor-driven agitator 79 comprising an impeller 80 mounted adjacent the top of a shaft 81 between a nut 82 and a bearing cap 83. Impeller 80 is concentrically arranged in the cylindrical air chamber 41 between inlet 42 and outlet 43 and has radially outwardly extending blades 84, as particularly shown in Fig. 4.

The motor driven drive for shaft 81 and impeller 80 is in coaxial alignment with the axis of air chamber 41 and with the impeller 80; and therebetween, is substantially a conventional universal coupling comprising a bored shaft portion 85 having a slot 86 adjacent one end thereof and at its other end secured to a universal joint 87 which in turn is removably secured to the drive shaft 88 of the motor drive, an electric motor 89. Longitudinally movable within the shaft portion 85 by limits defined by the slot 86, which facilitates the connection of shaft portion 85 with shaft 81, is a smaller diameter shaft portion 90 carrying a pin 91 vertically movable in the slot 86, and adjacent its upper end having a horizontally disposed pin 92 adapted to engage a slotted or toothed enlarged end portion 93 of shaft 81. A sleeve 94 is secured to shaft portion 90 and surrounds the pin 92, and is adapted to mate with the depending enlarged end portion 93 of shaft 81 to complete the coupling therewith.

The normally inoperative electric motor 89 is energized from a source of electric power through a circuit comprising conductors 95 and 96 and switch 97, as shown schematically in Fig. 7. Switch 97 is secured by a bracket 97a, Fig. 2, to mounting plate 51, and is a conventional normally open micro-switch operatively closed by the depression of a switch element 98, Fig. 5. Switch element 98 is actuated, in the preferred embodiment herein disclosed, by a resilient control arm 99 operatively coupled to the control element 71 by a contacting screw 100 carried at one end of arm 99 and biased by the resiliency of arm 99 into contact with the control element 71; whereby, the downward movement of control element 71, which acts to open the valve 62, moves screw 100 and therewith control arm 99 downwardly to actuate the switch element 98 and therewith render motor 89 operative to rotate the impeller 81.

A refrigerating system comprising a condenser 101, a primary evaporator coil 102 and a secondary evaporator coil 103 is provided. The details and connection of these parts, together with other necessary structure of a refrigerating system, are not shown in the drawings but is comprises a conventional refrigerating system contained within the housing 11; and wherein, evaporator coil 102 is connected, generally by soldering, to the side wall 15 of receptacle 14 as shown in Fig. 3, and is in heat exchange relationship with the reservoir 18, and the secondary coil 103 is connected in series with the primary coil and is secured, generally by soldering, to the sleeve 52 as shown in Fig. 3, in heat exchange relationship with cylinder 44 and the air chamber 41 therein.

A front decorative plate or grill 104 extends vertically between mounting plate 51 and the partition 50 of housing 11 and generally defines one side of a generally open dispensing zone 105; the lower and upper limits of which are generally defined by the open discharge end 39 and the partition 50. Partition 50 has a forward apertured portion 106, see Fig. 1, defining a cup support directly beneath the open discharge end 39. The apertures of portion 106 lead to a drain chamber 107 beneath the partition 50 adjacent the motor 89.

My invention, as disclosed herein, is generally to be operated by a clerk in behind-the-counter use, and it is not operated by the customer; however, my invention may clearly be adapted to be operated by the customer or ultimate consumer.

The operation of my invention is as follows:

Assuming reservoir 18 to be filled with a suitable beverage or beverage syrup, movement by the clerk or operator of the handle end 73 of control element 71 downwardly from the position shown in Fig. 3 opens valve 62 and simultaneously closes switch 97 to operate motor 89. With the valve 62 open, the beverage passes from reservoir 18 through bore 61 of conduit section 57 into air chamber 41 where the beverage flow is intercepted by the rapidly rotating impeller 80 which thoroughly mixes and agitates the beverage with air to a smooth and creamy consistency. The aerated beverage passes through outlet 43 of air chamber 41 into nozzle 47 to the open discharge end 39, and then to a suitable cup or container, not shown in the drawings, positioned on the cup support portion 106 of partition 50. When the cup is nearly full, the clerk will release handle end 73 of control element 71, and spring 66 then moves valve 62 to its closed position and control element 71 moves therewith to its original starting position shown in Fig. 3; and the movement of control element 71 to the position of Fig. 3 opens switch 97.

It is a feature of my invention to provide the aerating chamber 41 intermediate the reservoir 18 and the open discharge end 39 whereby the normally inoperative impeller 80 is simultaneously actuated by the opening of valve 62 to vigorously agitate and aerate the beverage as it is being dispensed. Further, it is important that there is no build-up of beverage in the aerating or air chamber 41 but that impeller 80 only intercepts the generally vertically downward flow of the beverage from the reservoir 18 to the receiving cup or container. Thus, in the disclosure herein, it is important that the minimum cross sectional area of the section of conduit 38 below the air chamber 41, that is nozzle 47, is greater than the minimum cross sectional area of the section of conduit 38 above the air chamber 41 when the valve 62 is fully open, which herein is the valve port 63, and further that the air chamber 41 has a minimum cross sectional area at least equal to that of the lower conduit section. By intercepting the flow of beverage as it flows from the reservoir 18 to the receiving cup or container in the manner described, I am able to provide a more effective and thorough aerating of the beverage than by any previous procedure.

It is generally necessary with the type of beverage intended to be dispensed that it be served to the customer in a cooled and preferably chilled condition. It is a very important feature in the concept of my novel and improved dispenser that the beverage is not only cooled by the evaporator coil 102 while it is retained in the reservoir 18, but in addition is also cooled while it is being dispensed and aerated by means of the evaporator coil 103 positioned in heat exchange relationship with the air chamber 41. This insures that the beverage served to the customer is maintained in a chilled condition. A further feature of my novel and improved beverage dispenser is the fact that after a cup of beverage has been dispensed there is retained in the drained cylinder 44 a film of residue beverage which, during the non-dispensing period of my dispenser at which time valve 62 is closed and agitator 79 is inoperative, is cooled to an iced condition by evaporator coil 103; and when the next dispensed cup of beverage is passed through chamber 41, this iced film of residue beverage is thrown or scraped off by the agitator 79 and/or is loosened or absorbed by the passing beverage to be absorbed in, or transmitted to this next dispenser cup of beverage.

It will be obvious to those skilled in the art that my invention may be modified by many substitutions and equivalents, that my invention has other important features and objectives than recited herein, and that this disclosure is intended to be illustrative only. Therefore, I intend to be limited solely by the scope of the appended claims.

What I claim is:

1. In a beverage dispenser, a beverage receptacle, a gravity flow conduit leading generally downwardly from the receptacle and having an open discharge end at a dispensing zone and in constant communication with atmosphere, said conduit comprising a diametrically enlarged intermediate portion defining an air chamber having an inlet and an outlet, said outlet being unrestricted and disposed at the bottom of said air chamber, a normally closed control valve associated with said conduit between the receptacle and the air chamber controlling the flow through said conduit and having a control element, a normally inoperative motor-driven agitator located in said chamber between the inlet and outlet thereof which intercepts the beverage flowing through said chamber and mixes the same with air to a creamy consistency, and a control for the motor-driven agitator comprising a switch operatively coupled to the control element of the valve to be actuated thereby in a direction to render the agitator operative as a result of valve opening movements of said element.

2. The structure defined in claim 1 in which the intermediate section of said conduit which defines the air chamber is generally cylindrical with its axis generally vertically disposed, the conduit section above the air chamber discharging axially into said air chamber through the top thereof, said agitator comprising an impeller concentrically arranged in the cylindrical air chamber below the top inlet thereto, and mounted for rotation about the generally vertical axis of said air chamber, and said outlet at the bottom of said air chamber being disposed offset from the generally vertical axis of said air chamber.

3. The structure defined in claim 1 wherein the minimum cross-sectional area of the section of the conduit below the air chamber is greater than the minimum cross-sectional area of the section of the conduit above the air chamber when the valve is fully opened, and wherein the air chamber has a minimum cross-sectional area at least equal to that of the lower conduit section.

4. The structure defined in claim 3 in further combination with a refrigerating system having an evaporator externally of but in heat transfer relation with the conduit structure defining the air chamber.

5. The structure defined in claim 3 in further combination with a refrigerator system having evaporator coils in heat transfer relation with the reservoir and the conduit structure defining the air chamber.

6. In a bulk beverage dispenser, a beverage reservoir, a gravity flow conduit leading generally downwardly from the reservoir and having an open discharge end at a dispensing zone and in constant communication with atmosphere, said conduit comprising a diametrically enlarged generally cylindrical intermediate portion having its axis generally vertically disposed and which defines an air chamber having an inlet and an outlet, said inlet being at the top of said air chamber and the outlet being at the bottom thereof, the conduit section above the air chamber discharging axially into said air chamber through said top inlet and said outlet opening into the conduit section below the air chamber at a point offset from the generally vertical axis thereof, a normally closed valve associated with said conduit between the reservoir and the air chamber for controlling flow through said conduit and having a control element, the minimum cross-sectional area of the section of the conduit below the air chamber being greater than the minimum cross-sectional area of the section of the conduit above the air chamber when said valve is fully opened and said air chamber having a minimum cross-sectional area at least equal to that of the lower conduit section, a normally inoperative motor-driven rotary agitator comprising an impeller concentrically arranged in said cylinderical air chamber between the inlet and outlet thereof which intercepts the beverage flow through said chamber and mixes the same with air to a creamy consistency, a control for the motor-driven agitator comprising a switch operatively coupled to the control element of the valve to be actuated thereby in a direction to render the agitator operative as a result of valve opening movements of said element, a cup support located below the discharge end of the lower conduit section, the motor drive for the agitator being in coaxial alignment with the impeller and air chamber but being located below the plane of the cup support, and a drive shaft extending from the shaft of the motor axially through the bottom of the air chamber and in lateral offset relation to the cup support.

7. The structure defined in claim 1 in which the intermediate portion of said conduit which defines the air chamber extends generally vertically, the conduit portion above the air chamber discharging into said air chamber longitudinally through the top thereof, said agitator being generally concentrically disposed in said air chamber below the top inlet thereto and having an axis of rotation extending longitudinally of the air chamber and the direction of flow therethrough, and said outlet at the bottom of said air chamber being disposed offset from the axis of rotation of said agitator.

8. In a beverage dispenser, a beverage receptacle, a gravity flow conduit leading generally downwardly from the receptacle and having an open discharge end at a dispensing zone in constant communication with atmosphere, said conduit comprising a diametrically enlarged intermediate portion defining an air chamber having an inlet and an outlet, said outlet being unrestricted and disposed at the bottom of said air chamber, a normally closed control valve associated with said conduit between the receptacle and the air chamber controlling the flow through said conduit and having a control element, and a motor-driven agitator located in said chamber between the inlet and outlet thereof which intercepts the beverage flowing through said chamber and mixes the same with air to a creamy consistency.

References Cited in the file of this patent

UNITED STATES PATENTS

| | | |
|---|---|---|
| 1,180,344 | Valentine | Apr. 25, 1916 |
| 1,436,009 | Butterfield | Nov. 21, 1922 |
| 2,358,756 | Zoller | Sept. 19, 1944 |
| 2,513,035 | Lopata | June 27, 1950 |